United States Patent
Lemieux et al.

(10) Patent No.: US 7,068,299 B2
(45) Date of Patent: Jun. 27, 2006

(54) SYSTEM AND METHOD FOR GRAPHICALLY CONFIGURING A VIDEO CALL

(75) Inventors: James Patrick Lemieux, Austin, TX (US); Kurtis L. Seebaldt, Round Rock, TX (US)

(73) Assignee: Tandberg Telecom AS, Lysaker (NO)

( * ) Notice: Subject to any disclaimer, the term of this patent is extended or adjusted under 35 U.S.C. 154(b) by 492 days.

(21) Appl. No.: 10/002,434

(22) Filed: Oct. 26, 2001

(65) Prior Publication Data

US 2003/0081110 A1 May 1, 2003

(51) Int. Cl.
*H04N 7/14* (2006.01)

(52) U.S. Cl. .................. 348/14.03; 348/14.09
(58) Field of Classification Search ... 348/14.01–14.04, 348/14.07–14.09, 14.1, 14.11; 379/88.11, 379/93.17, 93.21, 202; 345/716, 718, 744, 345/753, 758; 370/260–261; 709/204
See application file for complete search history.

(56) References Cited

U.S. PATENT DOCUMENTS

| | | | |
|---|---|---|---|
| 5,594,859 A | | 1/1997 | Palmer et al. |
| 5,619,684 A | | 4/1997 | Goodwin et al. |
| 5,627,978 A | * | 5/1997 | Altom et al. ............. 345/758 |
| 5,644,628 A | | 7/1997 | Schwarzer et al. |
| 5,751,965 A | | 5/1998 | Mayo et al. |
| 6,011,579 A | * | 1/2000 | Newlin .................... 348/14.08 |
| 6,020,916 A | * | 2/2000 | Gerszberg et al. ....... 348/14.07 |
| 6,222,520 B1 | | 4/2001 | Gerszberg et al. |
| 6,415,020 B1 | * | 7/2002 | Pinard et al. ............ 379/88.11 |
| 6,417,869 B1 | * | 7/2002 | Do ............................ 345/718 |
| 6,501,740 B1 | * | 12/2002 | Sun et al. .................. 370/261 |
| 6,549,612 B1 | * | 4/2003 | Gifford et al. ............ 379/67.1 |
| 6,633,324 B1 | * | 10/2003 | Stephens, Jr. ............ 348/14.09 |
| 6,642,942 B1 | * | 11/2003 | Crook ........................ 345/744 |
| 6,677,978 B1 | * | 1/2004 | Bowman ................. 348/14.09 |
| 2002/0015108 A1 | | 2/2002 | Takashima et al. ......... 348/484 |
| 2003/0142202 A1 | | 7/2003 | Bowman ................. 348/14.09 |

FOREIGN PATENT DOCUMENTS

JP 406062142 A * 3/1994

* cited by examiner

*Primary Examiner*—George Eng
(74) *Attorney, Agent, or Firm*—Oblon, Spivak, McClelland, Maier & Neustadt, P.C.

(57) ABSTRACT

A method and system for visual configuration of a video call represents video devices as graphical icons presented through a user interface. A directed graph relates the graphical icons to represent the configuration of the video devices in the video call and ensures that compatible video devices establish a valid video configuration by prohibiting invalid video call configurations. The user interface interacts with a video network platform that schedules and initiates video calls according to video call configurations. Video device types, identification, and configuration parameters are depicted along with state information for a video call to allow monitoring and correction of failures that may occur.

18 Claims, 3 Drawing Sheets

SYSTEM AND METHOD FOR GRAPHICALLY CONFIGURING A VIDEO CALL

TECHNICAL FIELD

This invention relates generally to video call communications, and more specifically relates to a system and method for configuring a video call with graphical representations of video devices.

BACKGROUND

Video communications give a personal touch that is simply not available from audio only telephone communications. Participants in a video call have a greater personal presence and also are able to share presentations and data in a more meaningful manner than is available with audio only communications. Indeed, businesses have invested substantial sums in video devices to take advantage of the more personal communication provided by video calls. As a result, video calls have grown as a more common manner of communications, both for intra company meetings and meetings with outside businesses conducted through public networks.

Unfortunately, configuring, scheduling and establishing a video call is a complex process beyond the expertise of most users of video devices. For instance, manufacturers of video devices typically include unique interfaces accessed through video endpoints that are complex and difficult to use. Even if a user becomes accustomed to a user interface of a give manufacturer, user interfaces of endpoints by different manufacturers are often substantially different so that users typically need to relearn video call configuration and set-up with each user interface. Assuming that a user is able to successfully interact with a video end point user interface, other complexities remain as an obstacle to a successful video call configuration. With multi-endpoint video calls of three endpoints or more, the user must typically route the video call through a multi-call unit (MCU). As another layer of complexity, if video devices communicate over different protocols, such as H.323 and H.320, then the user typically must route the video call through a gateway device.

In addition to configuring a video call through different types of video devices made by different manufacturers, users seeking to configure a video call also must typically schedule the video devices so that they are available at the desired time of the video call. Companies typically delegate scheduling functions to technical staff who reserves devices and bandwidth for desired line speed for the video call. As video call technology advances, the scheduling of devices has grown more complex. For instance, video devices may include specially manufactured MCU and gateway devices or may include MCU and gateway devices provided by internet protocol servers with the video calls routed as TCP/IP packets. Thus, a video call between a large number of users may include a variety of specially manufactured video devices and internet-based video devices with an array of bandwidth and latency considerations that may affect video call quality. Further, to obtain optimal quality individual characteristics of video devices typically must be considered. Conventional user interfaces for video devices are generally not able to take these factors into consideration, thus making the involvement of qualified technical staff a necessity that slows the process of establishing video calls and adds to the cost of making video networking available.

SUMMARY

Therefore a need has arisen for a system and a method which provides a simplified user interface that configures video calls.

A further need has arisen for a system and method which reduces the cost and complexity associated with a user's configuration of a video call through disparate types of video devices.

A further need exists for a system and method which reduces the complexity of scheduling video calls through video devices by representing the video devices as graphical images.

In accordance with the present invention, a system and method are provided which substantially reduce the problems and disadvantages associated with configuring video calls. A user interface supports visual configuration of a video call through a manipulation of graphical representations of video devices interrelated through a directed graph.

More specifically, a user interface allows visual configuration of a video call in a video call configuration window with graphical representations of video devices. For instance, an icon is used to represent each video device to allow a user to easily grasp a video call configuration by viewing the arrangement of the icons. A directed graph relates the icons to each other to represent the configuration of the video devices in the video call. The icons and directed graph arrows depict parameters of the video devices and the video call configuration. The parameters of the video devices and video call configuration are also included in a device list window for easy reference by a user.

In order to configure a video call, the user selects a first video device, such as from a list of video devices in a video device dialog box, and places the graphical icon of the video device in the video call configuration window. The user the selects a second video device and places the graphical representation of the second video device in the video call configuration window. The video call configuration between the two selected video devices as illustrated by selecting the first graphical representation of the first video device and drawing a directed graph arrow from the first graphical representation to the second graphical representation of the second video device.

The user interfaces ensures that video call configurations do not include invalid actions. The user interface determines whether a video call between the first and second video devices is a valid action and prohibits the drawing of a directed graph arrow between the first and second graphical representations unless the video call between the first and second video devices is a valid action. If a user attempts an invalid action, the user interface presents valid options available to successfully configure the call. For instance, if a user attempts to configure a call having three video endpoints without using an MCU, the user interface presents the user with available MCUs that will result in a successful video call configuration. Similarly, if a user attempts to configure a video call with video endpoints that communicate using incompatible protocols, the user interface presents gateway video devices that the user may select to successfully configure the video call.

The user interface communicates with a video network platform to validate video call configurations and schedule selected video devices. A user interface control determines available video devices through coordination with a video call scheduler and a video device library. The user interface depicts available video devices through a video device dialogue box that identifies video device types, such as endpoints, MCUs and gateways of an internal video network, such as a business' intranet, and also external video devices that interface with the internal video network, such as external video endpoints, MCUs and gateways.

The selection of a video device type from a video device dialogue box, such as "add endpoints," results in depiction of an endpoint icon in the video call configuration window along with a list of endpoints available for selection and association with the icon. Once a video call configuration is complete, the user interface provides the video call configuration to a video call scheduler associated with the video network platform to reserve the devices. The video network platform aids in initiation of the video call and a video call monitor associated with the video network platform updates the user interface with the state of the video call to allow monitoring of the video call.

The present invention provides a number of important technical advantages. One important technical advantage of the present invention is that a user may configure a video call visually using graphical depictions that represent video devices. Visual depictions of video devices and a directed graph representing a video call configuration for the video devices are more readily understood by users and reduce the training and expertise needed to configure a video call. Thus, users are more likely to take advantage of video call equipment, improving the value of investments made in that equipment.

Another important technical advantage of the present invention is that the reduced complexity of configuring and scheduling video calls results in cost savings due to the reduced need for trained staff to manage these functions. For instance, the user interface limits the risk that a user will configure a video call with an invalid action. Further, if a user attempts an invalid action, valid actions are provided to reduce dependence on technical staff. Moreover, once a video call configuration is complete and scheduled with the video network platform, the video network platform is available to aid in initiation of the video call, thus reducing the need for the user to understand video endpoint interfaces.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments of the present invention are illustrated in the figures, like numerals being used to refer to like and corresponding parts of the various drawings.

Video networks typically include a variety of video devices, including different types of devices and devices of the same type that are made by different manufacturers and communicate with different types of protocols. For instance, a typical video conference call may involve a large number of video endpoints, each made by a different manufacturer, which communicate through one or more MCUs and gateways. Many businesses have invested in video communication infrastructure over time, so that their video networks include a variety of video devices. Even those businesses that have homogeneous video devices often establish video communications with other networks or over the public network so that the need for establishing video communications with inconsistent video devices will inevitably arise. Moreover, the shift in technology to video over internet protocol has led to a convergence of conventional video devices and internet-based devices, thus adding another layer of complexity to configuring a video call. The user interface of the present invention simplifies video call configuration by representing the video devices as graphical icons, determining whether a configuration of video devices presents a valid action and offering alternative valid actions when a user attempts an invalid action.

Figure 1:
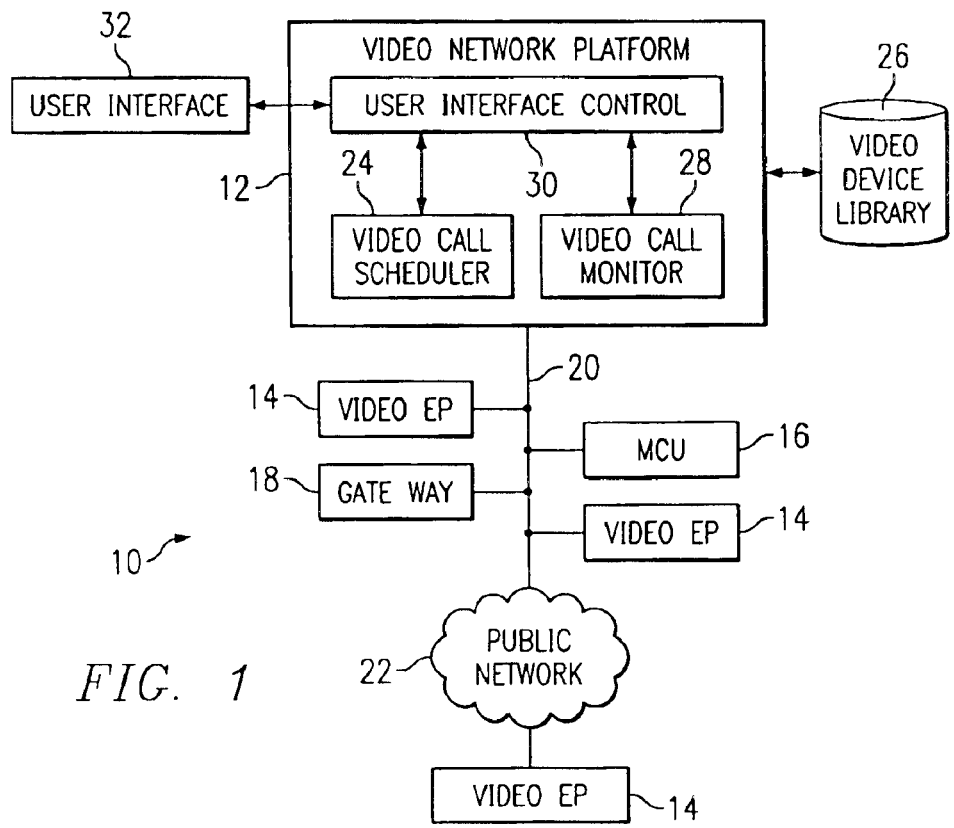
FIG. 1 depicts a block diagram of a user interface in communication with a video network platform and video network.

Referring now to FIG. 1, a block diagram depicts a video network 10 under the control of a video network platform 12. Video devices, including video endpoints 14, MCUs 16 and gateways 18, communicate with video network platform 12 over an internal company network 20, such as an intranet, or a public network 22, such as the internet. Video endpoints 14 include specially manufactured video communication equipment and personal computer based video communication equipment that record and transmit local images of participants and display images of other participants received from remote locations. MCUs 16 include specially manufactured and server based units that coordinate multi-endpoint video conference calls, including calls sent by TCP/IP. Gateways 18 resolve protocol inconsistencies, such as between the commonly used H.320 and H.323 video telecommunications protocols.

Video network platform 12 coordinates the actions of video devices, including the scheduling of video devices and initiation of video calls. Video call scheduler 24 tracks the availability of video devices for use based on a list of video devices in video device library 26. Once video network platform 12 establishes a video call, a video call monitor 28 monitors the state of the call to determine the use of video devices and any failures that may occur. A user interface control 30 communicates with video call scheduler 24 and video call monitor 28 to present video call configuration and state information on user interface 32.

Figure 2:
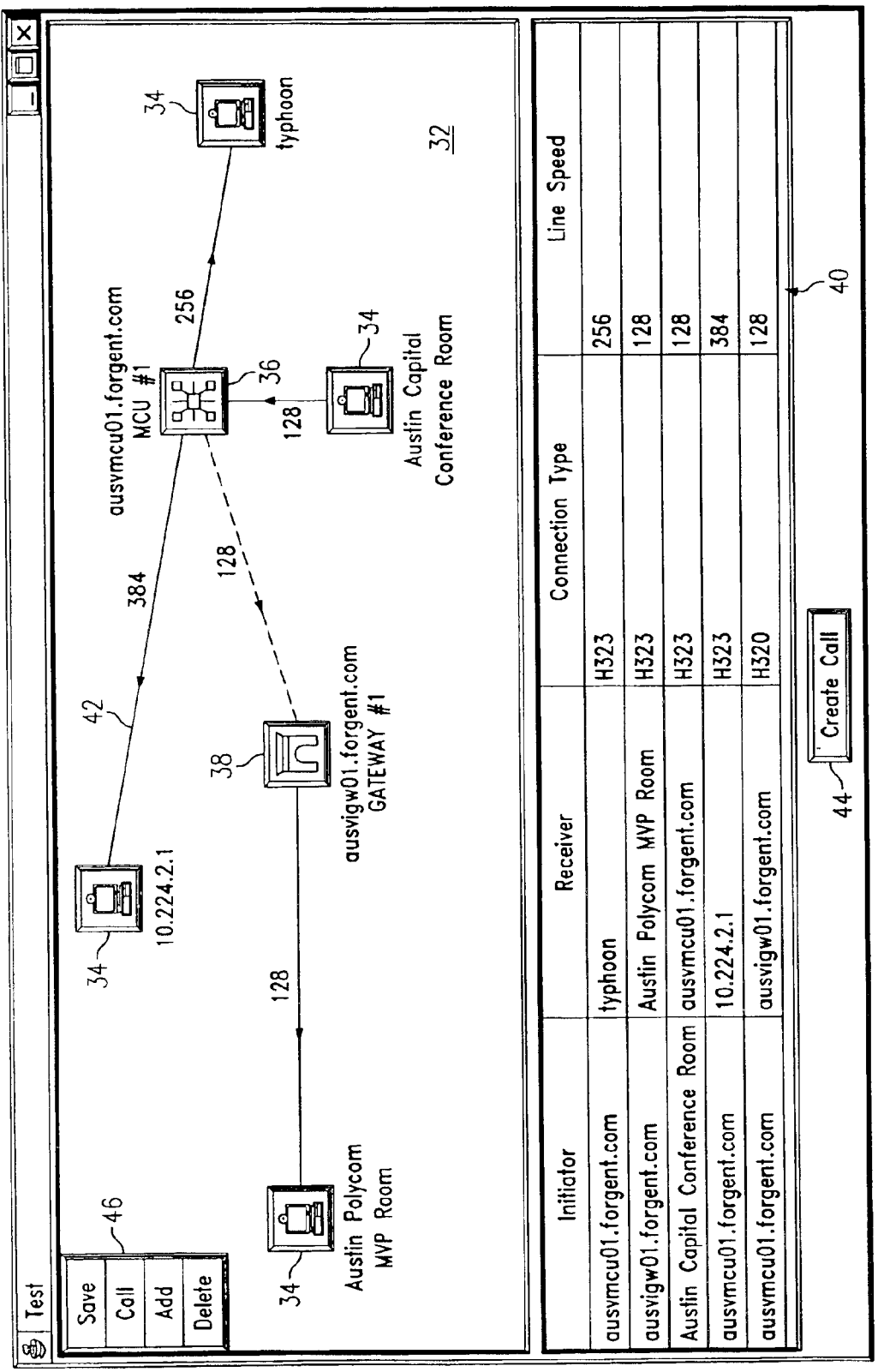
FIG. 2 depicts a user interface for visually configuring a video call.

Referring now to FIG. 2, an example of user interface 32 is depicted. Video endpoints are represented by video endpoint icon 34, MCUs are represented by MCU icon 36, and gateways are represented by gateway icon 38. A device list window 40 lists the video devices depicted by window 32, including identification of the video device that initiates a video call, that receives a video call, the protocol connection type for each video device and the line speed of the connection.

In the video call configuration depicted by window 32 of FIG. 2, a directed graph 42 relates the video devices to illustrate the video call parameters. For instance, the Austin capitol conference room video endpoint icon 34 initiates a video call to an MCU numbered as 1 and represented by MCU icon 36. The directed graph 42 illustrates an H.323 protocol connection at a line speed of 128, and may also illustrate additional video call parameters such as bandwidth and latency parameters for internet protocol video calls. MCU No. 1 in turn initiates three video calls, one to a video endpoint labeled typhoon that is located within the MCU's local network, one to a video endpoint device labeled 10.224.2.1 that is located at an exterior network, and one to a video device labeled Austin Polycom MVP room that is routed through a gateway numbered as 1 and represented by a gateway icon 38.

User interface 32 communicates with a user interface control 30 of video network platform 12 to determine the validity of a video call configuration and to schedule or initiate a video call according to a video call configuration. For instance, a user may configure a call directly between the Austin capitol conference room video endpoint and the typhoon video endpoint by displaying representative graphical icons in window 32 and drawing a directed to graph arrow 42 between the two graphical icons. User interface 32 confirms the protocol connection type as H.323 and offers a line speed selection or selects a line speed for the user to complete the video call configuration.

User interface 32 provides alternatives for invalid actions input by a user. For instance, if the user attempts to add a third video endpoint, such as endpoint 10.224.2.1, then user interface control 30 determines that a three-way video conference call is an invalid configuration unless the call is routed through an MCU, and thus prohibits the drawing of a directed graph from the Austin capitol conference room endpoint to the 10.224.2.1 endpoint. Instead, user interface 32 presents the user with an option to configure a valid video call, such as by warning the user to add an MCU, or by automatically adding an MCU and drawing directed graphs from the MCU to the typhoon and 10.224.2.1 endpoint, thus resulting in a valid video call configuration. Similarly, if a user attempts to add an endpoint having an inconsistent protocol connection type then user interface control 30 determines the need for a gateway video device and aids the user in establishing a valid video call configuration. For instance, the dotted directed graph 42 between MCU 1 and gateway 1 indicates an H.320 protocol connection through a gateway device for supporting the Austin Polycom MVP room 34 endpoint.

User interface 32 provides simple interactive dialog boxes to aid video call configuration and initiation of video calls. For instance, to create a call, a user selects the "create call" button 44 and is presented with a clean window 32. To save a video configuration, the user selects save from the drop down dialog box 46, resulting in storage of the video configuration by video call scheduler 24. To initiate a video call according to the video configuration presented in window 32, the user selects call from drop down dialog box 46. The user may add or delete video devices or perform other functions available from the user interface control by interacting with the drop down dialog box 46. As an example, once a video call is initiated, video call monitor 28 updates user interface 32 with state information relating to the video call. If a video device fails the failure may be indicated in red, thus allowing the user to re-establish the call by adding a different video device through the drop down dialog box and also initiating a call with the added device.

Figure 4:
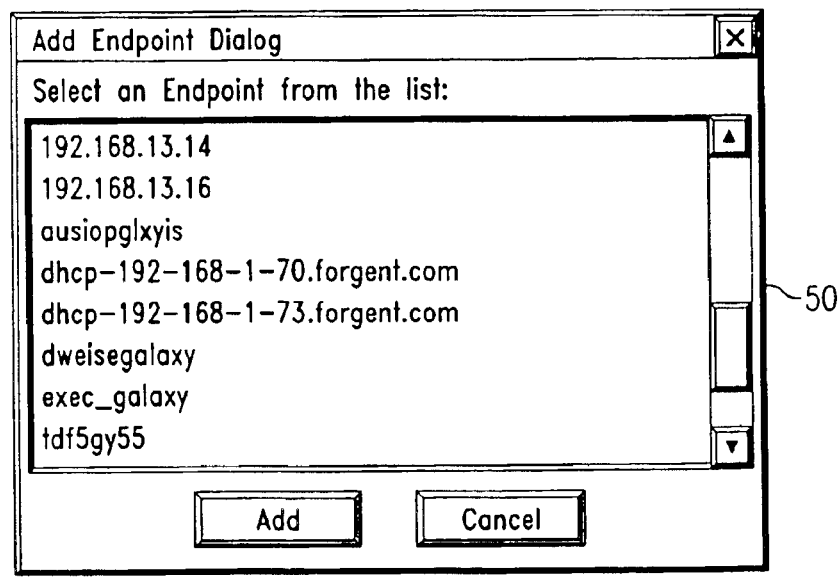
FIG. 4 depicts an add endpoint dialogue box.
Figure 3:
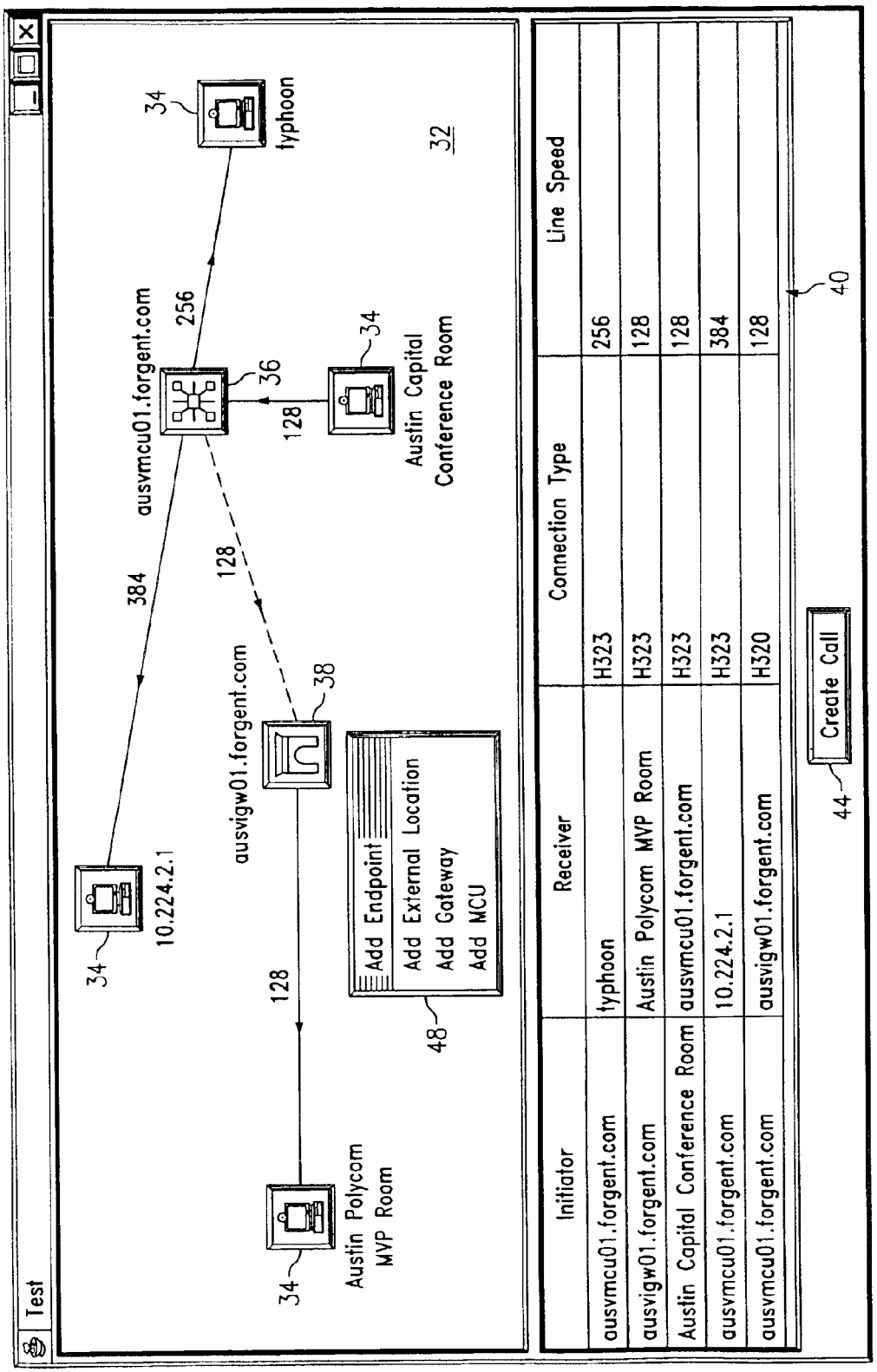
FIG. 3 depicts a user interface and video device type dialogue box.

Referring now to FIG. 3, an example of a dialogue box 48 is depicted. A user brings up dialog box 48 through, for instance, a right mouse click and selects a function from dialog box 48 with a left mouse click. Dialog box 48 includes four basic functions: adding an endpoint, adding an external location, adding a gateway and adding an MCU. If, for instance, adding an external location is selected then the user may select the external location from a list provided by video device library 26 or may add calling information that identifies the address of the external location. If a user selects adding an endpoint, then an add endpoint dialog box 50 depicted by FIG. 4 provides the user with a list of endpoints available from video device library 26 for the local video network. The user selects the desired endpoint from the dialog box 50 and selects the add button to add a graphical icon of the selected endpoint to the window 32. A video call configuration, including the added endpoint, is established by clicking on the endpoint with the mouse and then clicking on the video device graphical icon that the added endpoint will initiate contact to in order to draw a directed graph between the added endpoint and the contacted endpoint.

User interface 32 simplifies the process of configuring a video call by representing video devices with graphical icons. The reduced complexity of configuring a video call encourages the use of video devices by reducing the reliance of end users on trained technical staff and ensures that users will establish valid video call configurations with available video devices. Interaction with the video network platform 12 automates scheduling and video call initiation, and provides greater flexibility for users to monitor video call progress and correct difficulties that may arise.

Although the present invention has been described in detail, it should be understood that various changes, substitutions and alterations can be made hereto without departing from the spirit and scope of the invention as defined by the pending claims.

What is claimed is:

1. A user interface for visually configuring a video call, the user interface comprising:

a video call configuration window having plural icons, each icon representing a video device; and a directed graph relating the icons to represent the configuration of the video devices in the video call, the directed graph depicting one or more parameters for one or more of the video devices of the video call configuration;

wherein the video call configuration window is operable to allow a user to draw a directed graph between icons that represent compatible video devices in a valid video call configuration and to prohibit a user to draw a directed graph between icons that represent an invalid video call configuration.

2. The user interface of claim 1 further comprising a video device dialog box operable to add one or more video device types to the video call configuration window.

3. The user interface of claim 2 wherein selection of a video device type from the video device dialog box is operable to depict a library of available video devices of the selected video device type.

4. The user interface of claim 2 wherein addition of a video device type to a video call implicates one or more additional video devices to establish a valid video call configuration, the user interface further comprising a dialog box that identifies video devices needed for a valid video call configuration.

5. The user interface of claim 1 wherein a parameter comprises the line speed of the video device associated with the directed graph.

6. The user interface of claim 1 wherein a parameter comprises the protocol of the video device associated with the directed graph.

7. The user interface of claim 1 wherein a parameter comprises the identification of the video device that initiates communication with one or more other video devices.

8. The user interface of claim 1 wherein the directed graph is operable to monitor a video call having the video call configuration by depicting changes in the state of the video call.

9. The user interface of claim 8 wherein changes in the state of the video cell comprise failure of a video device.

10. The user interface of claim 9 wherein failure of a video device is depicted with a red color.

11. The user interface of claim 1 further comprising a device list window associated with the video call configuration window, the device list window listing attributes of the video devices represented by the plural icons.

12. A method for visually configuring a video call with a computer user interface, the method comprising:

selecting a first video device for display as a first graphic by the user interface;

selecting a second video device for display as a second graphic by the user interface;

selecting the first graphic to initiate a directed graph arrow originating from the first graphic;

selecting the second graphic to draw the directed graph arrow from the first graphic to the second graphic representing a video call between the first and second video devices;

determining if a video call between the first and second video devices is a valid action; and prohibiting the drawing of a directed graph arrow between the first and second graphics unless the video call between the first and second video devices is a valid action.

13. The method of claim 12 wherein a video call between the first and second video devices requires configuration through a third video device, the method further comprising:

determining that a video call configuration for a video call between the first and second video devices requires a third video device; and presenting a graphic associated with the third video device to allow a valid video configuration using the third video device.

14. The method of claim 12 further comprising:

scheduling a video call according to the video call configuration.

15. The method of claim 12 further comprising:

initiating a video call according to the video call configuration.

16. The method of claim 15 further comprising:

monitoring the video devices of the initiated video call; and depicting the state of the monitored video devices through the user interface.

17. A video network comprising:

plural video devices;

a video network platform in communication with the plural video devices;

a user interface control associated with the video network platform and operable to depict the video devices as graphical icons, the user interface control further operable to depict plural of the video devices requested by a user for inclusion in a video call configuration as graphical icons related by a directed graph if the video call configuration is valid, the user interface control further operable to determine that one or more of the video devices requested by a user for inclusion in the video call configuration have an invalid configuration and to prohibit relating of the graphical icons associated with the invalid configuration by a directed graph.

18. The video network of claim 17 wherein the user interface is further operable to direct the video network platform to initiate a video call according to the video call configuration.

* * * * *

UNITED STATES PATENT AND TRADEMARK OFFICE
CERTIFICATE OF CORRECTION

| | | |
|---|---|---|
| PATENT NO. | : 7,068,299 B2 | Page 1 of 1 |
| APPLICATION NO. | : 10/002434 | |
| DATED | : June 27, 2006 | |
| INVENTOR(S) | : James Lemieux et al. | |

It is certified that error appears in the above-identified patent and that said Letters Patent is hereby corrected as shown below:

Column 7, line 2, change "cell" to --call--.

Signed and Sealed this

Twenty-first Day of November, 2006

JON W. DUDAS
*Director of the United States Patent and Trademark Office*